3 Sheets--Sheet 1.

A. RAIS.

Machines for Making Butt-Hinges.

No. 6,095. Reissued Oct. 20, 1874.

Attest: Harry Smith
Thomas McIlvain

Inventor:
Adrian Rais
by his Atty.
Hewson Auldem

A. RAIS.

Machines for Making Butt-Hinges.

No. 6,095. Reissued Oct. 20, 1874.

Attest:
Harry Smith
Thos. M. Swan

Inventor.
Adrian Rais
by his Attys
Strong and Son.

3 Sheets--Sheet 3.

A. RAIS:

Machines for Making Butt-Hinges.

No. 6,095.

Reissued Oct. 20, 1874.

Attest: Harry Smith
Thomas McIlvain

Inventor:
Adrian Rais
by his Attys.
Kerr & Anderson

UNITED STATES PATENT OFFICE.

ADRIAN RAIS, OF WATERBURY, CONNECTICUT, ASSIGNOR TO THE SCOVILL MANUFACTURING COMPANY.

IMPROVEMENT IN MACHINES FOR MAKING BUTT-HINGES.

Specification forming part of Letters Patent No. 66,626, dated July 9, 1867; reissue No. 6,095, dated October 20, 1874; application filed September 24, 1874.

*To all whom it may concern:*

Be it known that I, ADRIAN RAIS, of Waterbury, county of New Haven, State of Connecticut, have invented a Machine for Making Butt-Hinges, of which the following is a specification:

The object of my invention is to feed, bend, mill, and unite the match-blanks of a butt-hinge by machinery, constructed as hereafter described, so as to automatically conduct the match-blanks from two feed boxes or hoppers to the dies for bending the knuckles, thence to the milling-wheels or disks, and thence to a central point where the leaves of the two blanks are joined or interlocked, and the nail or rivet automatically inserted.

Figure 1:
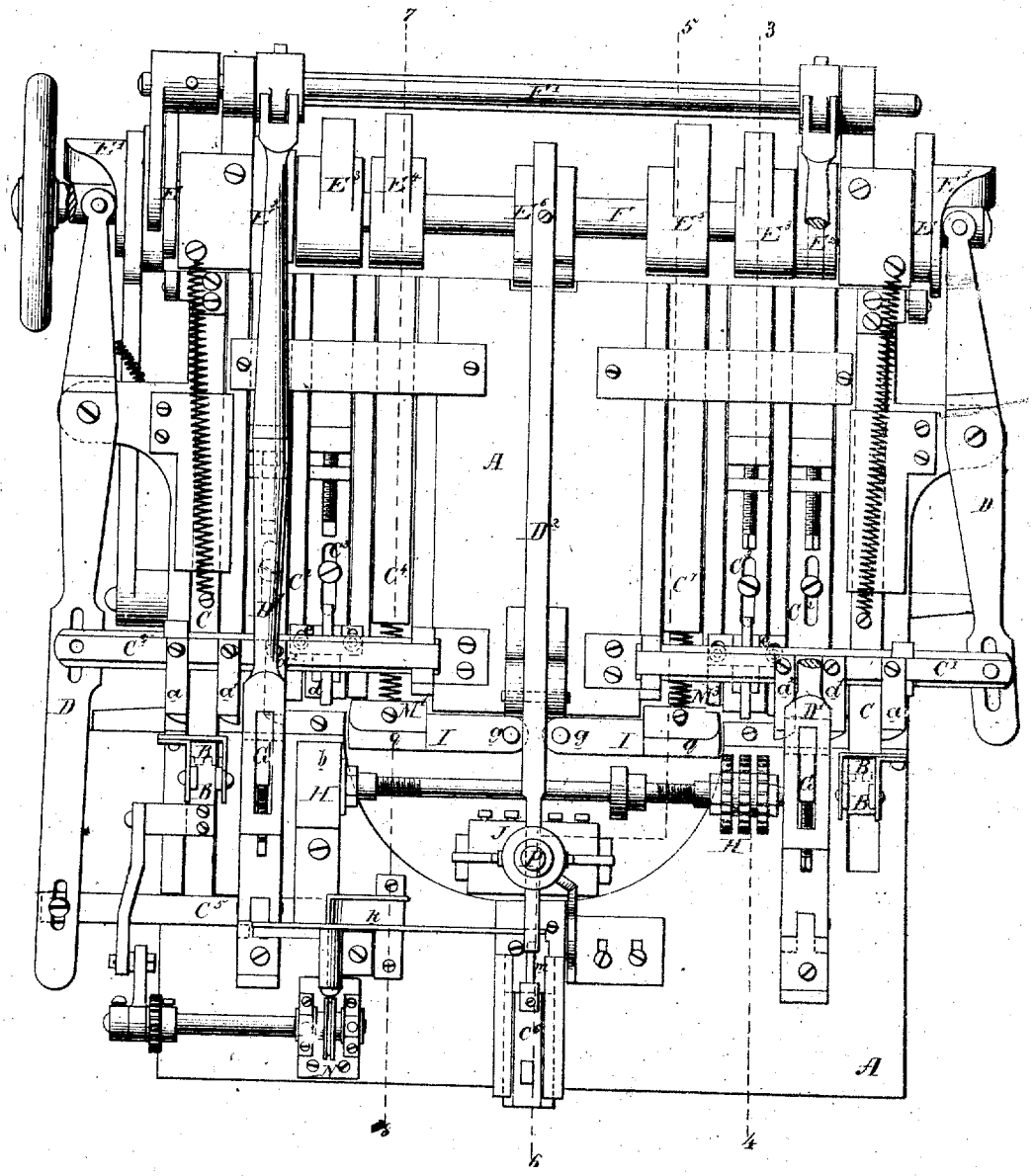
Figure 2:
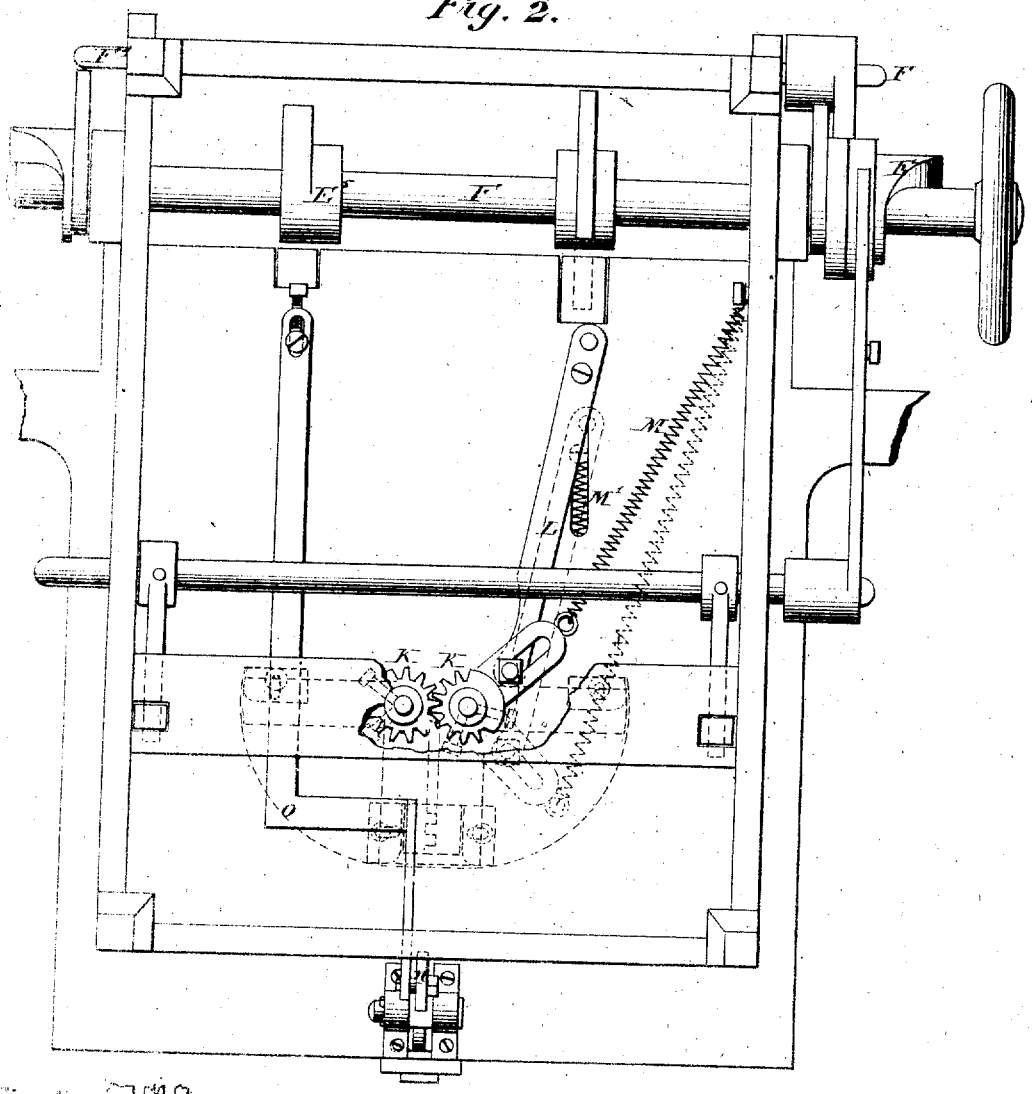
Figure 3:
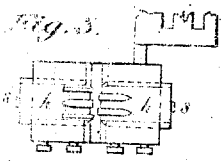
Figure 4:
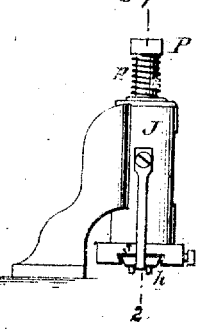
Figure 5:
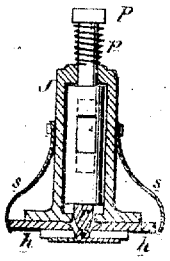
Figure 6:
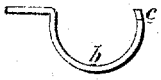
Figure 7:
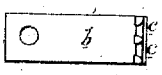
Figure 8:
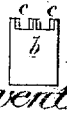
Figure 9:
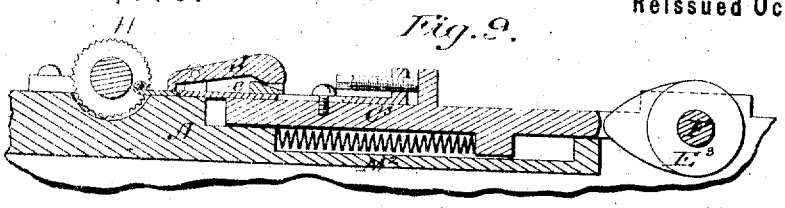
Figure 10:
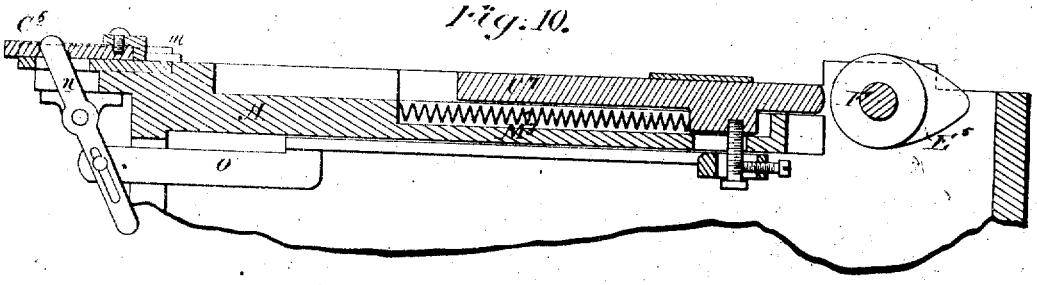
Figure 11:
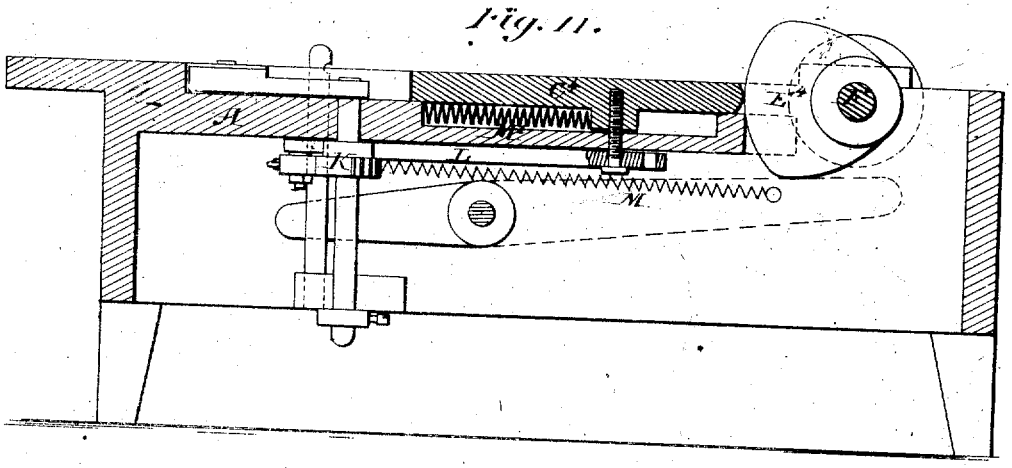

In the accompanying drawing, Figure 1, Sheet 1, is a plan view of the machine; Fig. 2, Sheet 2, an inverted plan view of the same; Fig. 3, Sheet 2, an inverted plan view of part of the machine detached; Fig. 4, a side elevation of Fig. 3; Fig. 5, a sectional elevation on the line 1 2, Fig. 4; Figs. 6, 7, and 8, detached views of part of the machine. Fig. 9, Sheet 3, a sectional elevation of the machine on the line 3 4, Fig. 1; Fig. 10, Sheet 3, a sectional elevation on the line 5 6, Fig. 1; and Fig. 11, Sheet 3, a sectional elevation on the line 7 8, Fig. 1.

A is the bed for the support of the machinery, and in the plan view, Fig. 1, are represented the various devices for performing the several different operations required in the manufacture of a butt-hinge, beginning with the vertical feed-boxes B B, which are placed on opposite sides of the bed-plate for the reception of right and left blanks respectively, the said blanks consisting of simple flat pieces of sheet metal of the required size and shape, and having projections on one edge, from which to form the knuckles of the hinge, as hereafter described. The blanks are withdrawn from the boxes B by slides C C, which are actuated by cams E E, on the driving-shaft F. The blanks are then pushed forward to a position directly in front of the bending dies by arms *a a* on slides $C^1$ $C^1$, operated by side levers D D, which derive their movement from cams $E^1$ $E^1$, also placed on the shaft F, as are all of the cams in the machine, and when the blanks are deposited in front of the bending-dies they are pushed into them by slides $C^2$ $C^2$, actuated by cams $E^2$ $E^2$. The blanks are pressed and held in place by clamps G G, while their projections are being bent into knuckles, the said clamps G being operated by long overhead levers D′ D′, connected with a rock-shaft, F′, all of which parts, and their operations severally and jointly, have been particularly described in a separate application which I have made for Letters Patent, and will, therefore, require no minute description here.

It will be observed that the greater portion of the operating mechanism is duplicated at the opposite sides of the machine; hence it will be sufficient to describe the details of one of the duplicate parts only in some cases, the letters and figures of designation being the same for corresponding parts on the opposite sides of the machine.

When the blanks have had their knuckles formed by the bending-dies, they are moved forward immediately by the arms $a^1$ on the slide-bars $C^1$, to a position in front of the milling-disks H, which are properly constructed for milling or dressing the joints, and beveling the bottom of the spaces in the knuckles. The milling-disks are covered also by cap-plates *b*, for protecting them from dust, and under the said disks are openings in the bed-plate for the discharge of the metal chips. The cap *b* is illustrated in the detached views Figs. 6, 7, and 8, and has gates or openings *c c* on its front lower edge corresponding with the number of the joints in the knuckles of the blanks in order to admit them. The gates *c c* are so tapered that they shall act as guides and gages to regulate the admission of the blanks for the purpose of milling them when they are pushed toward the disks by a slide, $C^3$, which is thrust forward by a cam, $E^3$, and drawn back by a spring, $M^2$. The blanks are held in place while they are being milled by the point of a small lever-clamp, *d*, pivoted to the front end of the slide $C^3$, and receiving its clamping movement from an inclined cross-bar, *e*, by which the rear end of the said lever-clamp is raised when the slide moves forward, as shown clearly in the sectional view, Fig. 9,

AVAILABLE COPY

Provision is made for withdrawing the blank from the milling-disks by any suitable mechanical device. After the blanks have been milled they are moved forward by the arm $a^2$ on the slide-bar $C^1$, and thus deposited upon the ends of wings or pivoted arms I I, while the latter are open, and are in a position in line with the direction of the movement of the said slide-bar $C^1$. After receiving the blanks the wings I I are closed or drawn together by turning them on their pivots *g g*, in order to bring the right and left blanks carried by the said wings directly opposite each other and beneath a box, J, which covers clamping and guiding devices subsequently described. The wings I I are moved by mechanism under the bed of the machine, connected with the slide $C^4$, which is actuated by the cam $E^4$. This mechanism is clearly shown in the inverted plan view, Fig. 2, and in the sectional view, Fig. 11. The pivots *g g* of the wings I I pass through the bed-plate, and are affixed to the axes of two segmental toothed wheels K K, Fig. 2, geared together and connected by a rod, L, with the slide-bar $C^4$, which gives the wings their closing movement when it is thrust forward by the cam, while the retrogade or opening movement of the said wings is accomplished by a spiral spring, M, in conjunction with a spring, $M^1$, which acts directly on the slide $C^4$, the said springs together drawing back the slide-bar $C^4$, in order to reverse the gear K K, by which the wings I I are directly actuated and opened.

The match-blanks are carried from the opposite milling-disks H by the wings I I, till they meet under the box J, with their knuckles and spaces facing each other, and on the under side of the box J are guides *h*, for directing the knuckles of each blank into the spaces between the knuckles of the opposite blank as they are brought together by the wings, as shown in Figs. 3, 4, and 5. Behind the leaves of the blanks are shoulders *q q*, on the wings I I, which crowd the said blanks into the guides, and thus unite the right and left knuckle-joints, to make a complete hinge.

The next operation is to introduce the wire nail or rivet. For this purpose suitable wire is cut into proper lengths by a pair of shears, *k*, in the ordinary manner, as it comes from rolls N, from which shears the nails are pushed forward into a position in front of and in line with the opening in the knuckle of the united blanks; or instead of cutting the nails off and feeding them in this manner, directly from the shears, they can be conveyed from a hopper.

The slide $C^5$ is actuated by the side lever D, and pushes the nails toward and to a position opposite the match-blanks. The nail, lying in a groove in line with the opening in the knuckle-joint of the blanks, is then pushed end foremost into the said opening by means of a punch, *m*, fixed to the end of a slide, $C^6$, Fig. 1. This slide is connected by a lever, *n*, to a rod, *o*, placed under the bed of the machine, and attached to a slide, $C^7$, actuated by the cam $E^5$. (See Figs. 2 and 10.) The slide $C^7$ is drawn back by a spiral spring, $M^3$, and is operated by cams on the shaft F, in the same manner as the other slides.

After the nail has been pushed into the joint of the blanks, and has thus connected them, the knuckles are leveled by the compression of a vertical clamp, P, which is operated by a lever, $D^2$, actuated by the cam $E^6$, (see Figs. 1 and 5.) The clamp P is provided with a spiral spring, *p*, to raise it, and its lower end *r* is grooved to fit on the knuckle-joint of the blanks placed directly underneath, as seen in Fig. 5. This operation of clamping the knuckle to set and level the joints is a new feature in the manufacture of butt-hinges, and as the result is very important in regard to their finish and economy in the manufacture, this feature is one requiring especial consideration.

In the ordinary method of coupling the match-blanks in pairs for making a butt-hinge, they are selected to fit each other, in order to insert the nails, and this is done because the knuckles are commonly closed or bent around entirely in the operation of bending, and the joints do not all agree.

By my improved method of manufacture the knuckles are not entirely bent round and closed, but are bent only so far around as to leave the openings in the match-blanks, when united, large enough to receive the nail easily, and when the blanks are brought together, as described, under the box J, and within the guides *h*, they are held firmly together by springs *s s*, arranged on opposite sides of the box and the guides, while the clamp P is pressed down upon the knuckle-joint of the match-blanks, as shown in Fig. 5.

By this means the knuckle of the match-blanks is entirely closed by the lateral pressure of the guides, and the joints are leveled down upon the nail by the vertical pressure of the clamp, so as to make a perfectly smooth-finished butt-hinge, which fits the nail accurately, so as to render riveting unnecessary, and is superior to any hitherto manufactured.

The match-blanks all come together, and with perfect accuracy; none are therefore wasted or lost. As soon as the clamping of the joints is completed, the wings I I retire to receive other blanks from the milling-disks, and the finished hinges fall through an opening in the bed of the machine into the receptacle below.

I claim as my invention—

1. The combination, in a hinge-machine, of the following elements, namely: A device for bending the joint, a device for milling the same, and mechanism for transferring the hinge-blank from the bending to the milling devices.

2. In a hinge-machine, the combination substantially as described, of devices for bending and milling the joint, with mechanism for transferring the hinge-blank from the bending to the milling devices, and from the latter to the riveting devices.

3. The closing and opening wings I, in combination with the milling-disks H, and with appliances for conducting the blanks from the disks to the wings, constructed and operating substantially as and for the purposes herein described.

4. The guide-caps *b*, in combination with the milling-disks H and the slides $C^3$, constructed and operating substantially as and for the purposes herein described.

5. The lever-clamps *d*, and inclined cross-bar *e*, in combination with the slides $C^3$ and the milling-disks H, constructed and operating substantially as and for the purposes herein described.

6. The clamp P and the guides *h*, in combination with the wings I, constructed and operating substantially as and for the purposes herein described.

7. The slide $C^5$ and nail-punch *m*, in combination with the wings I and the guides *h*, constructed and operating substantially as herein described.

In testimony whereof I have signed my name to this specification in the presence of two subscribing witnesses.

ADRIAN RAIS.

Witnesses:
M. L. SPERRY,
E. D. TUTTLE.